United States Patent
Stavely et al.

(10) Patent No.: US 7,221,398 B2
(45) Date of Patent: May 22, 2007

(54) ACCURATE PREVIEW FOR DIGITAL CAMERAS

(75) Inventors: Donald J. Stavely, Windsor, CO (US); Amy E. Battles, Windsor, CO (US); Sarah J. Barrios, Fort Collins, CO (US); Robert E. Sobol, Fort Collins, CO (US); Kenneth J. Hall, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 788 days.

(21) Appl. No.: 10/427,782

(22) Filed: May 1, 2003

(65) Prior Publication Data

US 2004/0218079 A1 Nov. 4, 2004

(51) Int. Cl.
*H04N 5/222* (2006.01)
(52) U.S. Cl. .................................. 348/333.05
(58) Field of Classification Search ................ 348/362, 348/333.02, 333.05, 333.11
See application file for complete search history.

(56) References Cited

U.S. PATENT DOCUMENTS

| | | | |
|---|---|---|---|
| 5,426,732 A * | 6/1995 | Boies et al. ................. | 715/839 |
| 5,486,893 A * | 1/1996 | Takagi ......................... | 396/147 |
| 6,122,006 A | 9/2000 | Bogdanowicz et al. | |
| 6,324,695 B1 * | 11/2001 | Lee et al. ...................... | 725/38 |
| 6,665,015 B1 * | 12/2003 | Watanabe et al. ........... | 348/362 |
| 6,677,988 B2 * | 1/2004 | Usami ......................... | 348/179 |
| 7,071,969 B1 * | 7/2006 | Stimson, III ........... | 348/207.11 |

FOREIGN PATENT DOCUMENTS

| | | |
|---|---|---|
| JP | 10-262164 A | 9/1998 |
| JP | 11-215429 A | 8/1999 |
| JP | 11215429 A * | 8/1999 |
| JP | 2001-169154 A | 6/2001 |

* cited by examiner

*Primary Examiner*—Vivek Srivastava
*Assistant Examiner*—Timothy J. Henn

(57) ABSTRACT

A digital camera and method that embodies a preview image that shows what the final image will look like, including depth of field and shutter speed temporal effects (blur). Preview images are displayed as a series of stop-action still images rather than as continuous video. Overlays or picture-in picture can be used to show live action video simultaneously for framing.

18 Claims, 2 Drawing Sheets

ACCURATE PREVIEW FOR DIGITAL CAMERAS

TECHNICAL FIELD

The present invention relates generally to digital cameras, and more specifically, to a digital camera and method that permits accurate preview capabilities.

BACKGROUND

One advantage of digital cameras is that they include a display so that a user can see an image after it is taken. The display can also be used for a "live preview" of the image before it is taken. Many digital cameras do not include an optical viewfinder, but rely entirely on the display for framing the image to be taken. When using the display as a viewfinder, a high frame rate is desired for easily framing the image without annoying image lag. The exposure and aperture settings used for the preview mode are chosen to maximize the frame rate, and are usually nothing like the settings for the final exposure.

It would be desirable to use the display to truly judge what the final image will look like. Unfortunately, this is at odds with the current practice of using the display as a viewfinder. Also, current display technology does not provide adequate image quality to do much more than coarsely frame the image. Advances in image technology, such as microdisplay and organic light emitting diode (OLED) displays make electronic viewfinding more practical and commonplace. On the other hand, this alone does not meet the need for a true WYSIWYG preview capability for digital cameras.

U.S. Pat. No. 6,122,006 discloses a "method for previewing a scene before actual capture by a motion-picture camera for permitting improved creative control of the scene ultimately captured by the motion-picture camera, the method comprises the steps of providing a digital representation of the scene; mapping the digital representation through a transfer function which maps the digital representation to image data representative of image data that a predetermined film will create; providing the mapped image data to a display; and displaying the image data on the display." However, U.S. Pat. No. 6,122,006 does not disclose or suggest anything regarding display of a series of stop-action still images, or depth of field and shutter speed temporal effects information.

It is an objective of the present invention to provide for an improved digital camera and method that provides for accurate preview capabilities.

SUMMARY OF THE INVENTION

To accomplish the above and other objectives, the present invention provides for a digital camera and method that embody a preview image mode that shows exactly what the final image will look like, including depth of field and shutter speed temporal effects (blur). Preview images are displayed as a series of stop-action still images rather than as continuous video. Overlays or picture-in picture can be used to show live action video simultaneously for framing.

More particularly, the present invention is a preview mode for digital cameras that shows the user exactly what the final image will look like as a series of still frames. The camera uses exactly the same shutter speed and aperture settings for the preview image and for the final image. For moderate to fast shutter speeds, the camera intentionally uses a slow frame rate to show preview images as a series of still images, so the user can evaluate motion blur. True aperture settings allows the user to evaluate depth of field effects.

This true preview mode is perfect for evaluating the image, but is awkward for framing it due to the slow frame rate. The present invention solves this problem by including an optical viewfinder in the camera. An alternative to the use of the viewfinder is to have two switchable preview modes, one that is video and one that is stop-action. A third alternative is to provide both views simultaneously, using a split screen, picture-in-picture, or one image overlaying the other. Finally, the camera may be adapted to automatically switch between modes, based on motion of the camera or of the image.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which.

DETAILED DESCRIPTION

Figure 1A:
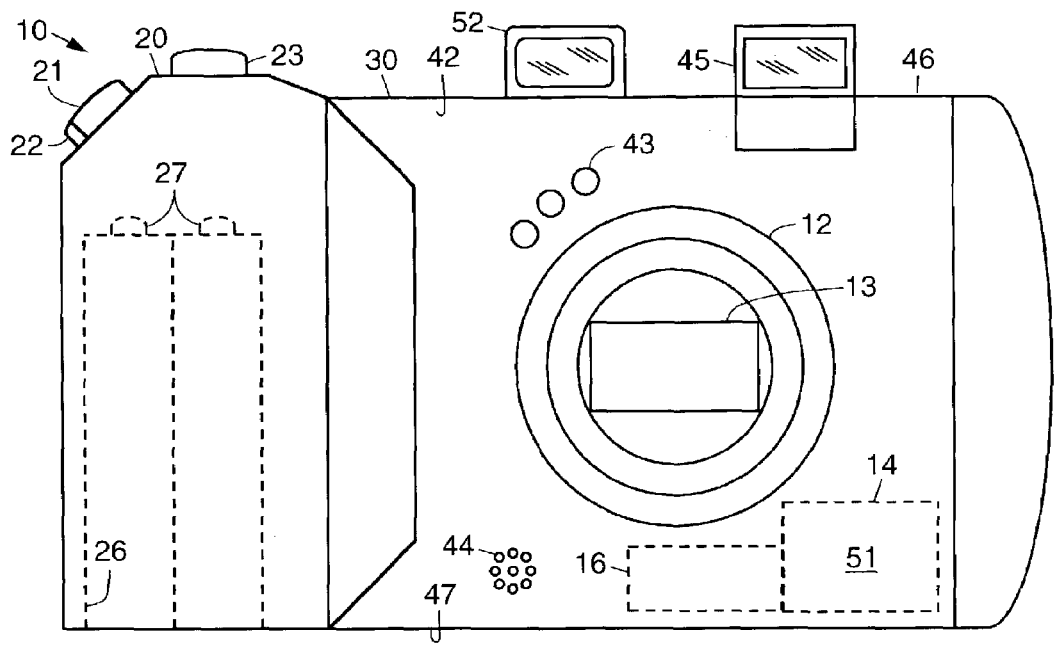
FIGS. 1a and 1b are front and back views, respectively, that illustrate an exemplary embodiment of a digital camera in accordance with the principles of the present invention having a preview mode that permits preview alternatives.
Figure 1B:
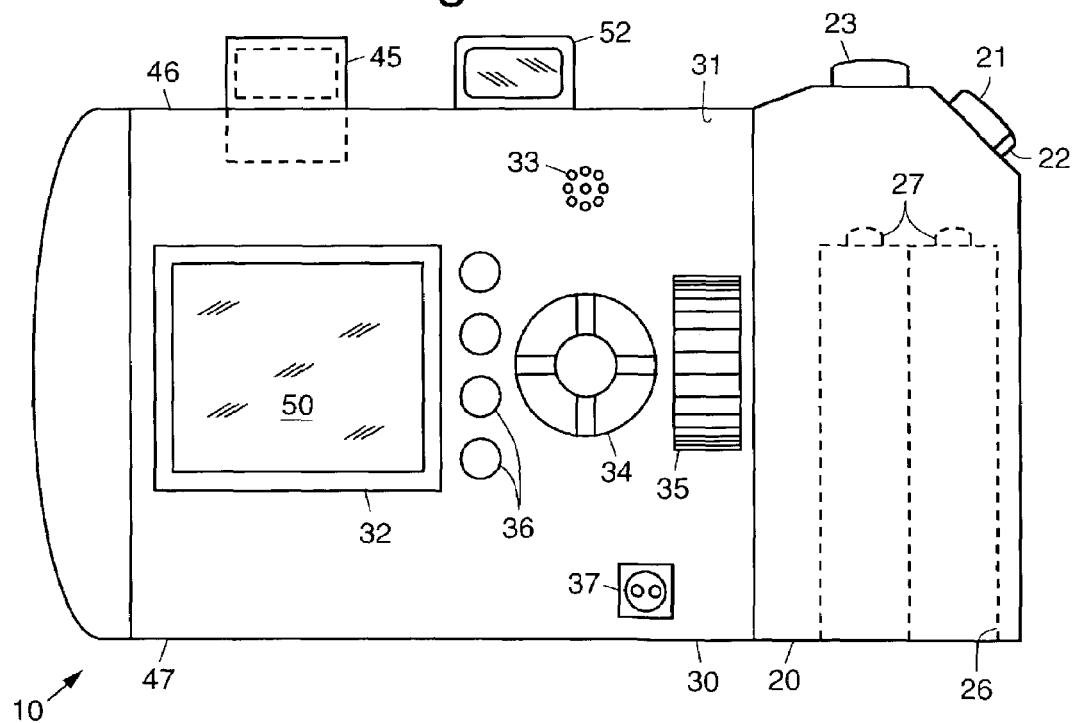

Referring to the drawing figures, FIGS. 1a and 1b show front and back views, respectively, that illustrate an exemplary embodiment of a digital camera 10 in accordance with the principles of the present invention. The exemplary digital camera 10 comprises an preview mode 50 in accordance with the principles of the present invention that permits preview alternatives.

The exemplary digital camera 10 comprises a handgrip section 20 and a body section 30. The handgrip section 20 includes a power button 21 having a lock latch 22, a shutter button 23 (or record button 23), and a battery compartment 26 for housing batteries 27. As is shown in FIG. 1a, a metering element 43 and microphone 44 are disposed on a front surface 42 of the digital camera 10. A pop-up flash 45 is located adjacent the top surface 46 of the digital camera 10.

As is shown in FIG. 1a, the digital camera 10 also comprises a lens 12, or imaging optics 12, and an image sensor 13 for receiving images transmitted by the imaging optics 12. A processor 14 (or microprocessor 14) is coupled to the image sensor 13 (and other control and input/output components). A memory device 16 is coupled to the image sensor 13 and processor 14 that is used to store images recorded by the digital camera 10.

As is shown in FIG. 1b, a rear surface 31 of the exemplary digital camera 10 includes a display device 32, such as a color microdisplay 32 or organic light emitting diode (OLED) display 32, for example, a rear microphone 33, a joystick pad 34, a zoom control dial 35, a plurality of buttons 36, including a preview mode button 36, for setting functions of the camera 10, and an output port 37 for downloading images to an external display device or computer, for example.

The preview mode 50 (generally designated) embodied in the digital camera 10 is implemented by a preview mode algorithm 51 embodied in the processor 14 that generates a display on the display device 32 that shows the user exactly what the final image will look like as a series of still frames.

The camera 10 is configured by the preview mode algorithm 51 to use exactly the same shutter speed and aperture settings for the preview image and it does for the final image. For moderate to fast shutter speeds, on the order of $1/30^{th}$ second or shorter, for example, the camera 10 is intentionally configured by the preview mode algorithm 51 to use a slow frame rate to show preview images as a series of still images, so the user can evaluate motion blur. True aperture settings allows the user to evaluate depth of field effects.

This true preview mode 50 provided by the present invention is perfect for evaluating the image, but is awkward for framing the image due to the slow frame rate. To overcome this, the camera 10 comprises image framing apparatus 52. In one embodiment, the image framing apparatus 52 used in the camera 10 comprises an optical viewfinder 52. In an alternative embodiment, the image framing apparatus 52 used in the camera 10 comprises two switchable preview modes 50, one that is video and one that is stop-action. In a third alternative embodiment, the image framing apparatus 52 used in the camera 10 displays both views (video and stop-action) simultaneously, using a split screen, picture-in-picture, or one image overlaying the other. In addition, the preview mode algorithm 51 in the camera 10 may be configured to automatically switch between modes, based on motion of the camera 10 or of the image.

Figure 2:
FIG. 2 is a flow diagram illustrating and exemplary method in accordance with the principles of the present invention.

FIG. 2 is a flow diagram illustrating and exemplary method 60 in accordance with the principles of the present invention. The exemplary method 60 comprises displaying 61 a series of stop-action still preview images on a display device 32 f the digital camera 10 that show what the final images will look like, including depth of field and shutter speed temporal effects.

Thus, an improved digital camera having a preview mode that permits preview alternatives and related method have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A digital camera comprising:
   imaging optics;
   an image sensor for receiving images transmitted by the imaging optics;
   a display device; and
   a processor coupled to the image sensor, the display device and an image framing apparatus that implements a preview mode algorithm that generates and displays a series of stop-action still preview images on the display device that show what the final images will look like, including depth of field and shutter speed temporal effects;
   wherein the preview mode algorithm is configured to automatically switch between modes, based on motion of the camera or motion of the image.

2. The digital camera recited in claim 1 wherein the display device comprises a color microdisplay.

3. The digital camera recited in claim 1 wherein the display device comprises a organic light emitting diode display.

4. The digital camera recited in claim 1 further comprising an image framing apparatus.

5. The digital camera recited in claim 4 wherein the image framing apparatus comprises an optical viewfinder.

6. The digital camera recited in claim 1 further comprising switchable preview modes.

7. The digital camera recited in claim 6 wherein the switchable preview modes comprise two switchable preview modes, one that is video and one that is stop-action.

8. The digital camera recited in claim 1 wherein the image framing apparatus displays video and stop-action images simultaneously.

9. The digital camera recited in claim 8 wherein the image framing apparatus comprises a split, screen display device.

10. The digital camera recited in claim 8 wherein the image framing apparatus comprises a picture-in-picture display device.

11. The digital camera recited in claim 8 wherein the image framing apparatus comprises overlaid images on the display device.

12. A method for providing a preview mode on a digital camera, comprising the steps of:
    displaying a series of stop-action still preview images on a display device of the digital camera that show what the final images will look like, including depth of field and shutter speed temporal effects;
    displaying two switchable preview modes, one that is video and one that is stop-action; and
    automatically switching between modes, based on motion of the image.

13. The method recited in claim 12 further comprising displaying video and stop-action images simultaneously.

14. The method recited in claim 12 further comprising displaying video and stop-action images as a picture in a picture.

15. The method recited in claim 12 further comprising displaying video and stop-action images on a split screen.

16. The method recited in claim 12 further comprising displaying overlaid video and stop-action images.

17. The method recited in claim 12 which automatically switches between modes.

18. The method recited in claim 12 which automatically switches between modes, based on motion of the camera.

* * * * *

UNITED STATES PATENT AND TRADEMARK OFFICE
CERTIFICATE OF CORRECTION

PATENT NO.       : 7,221,398 B2
APPLICATION NO.  : 10/427782
DATED            : May 22, 2007
INVENTOR(S)      : Donald J. Stavely et al.

It is certified that error appears in the above-identified patent and that said Letters Patent is hereby corrected as shown below:

On the Title page, in field (56), under "Foreign Patent Documents", in column 2, line 2, delete "JP    11-215429  A    8/1999" (Repeated Entry).

In column 4, line 25, in Claim 9, after "split" delete ",".

Signed and Sealed this

Nineteenth Day of May, 2009

JOHN DOLL
*Acting Director of the United States Patent and Trademark Office*